T. E. WHITE AND G. McINTOSH.
PHONOGRAPH MOTOR.
APPLICATION FILED MAR. 25, 1919.
1,349,401.  Patented Aug. 10, 1920.
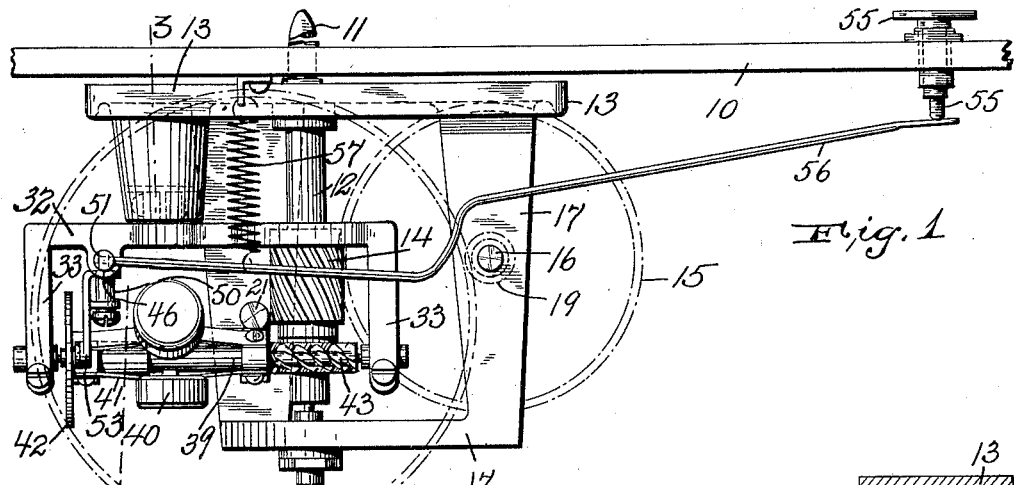
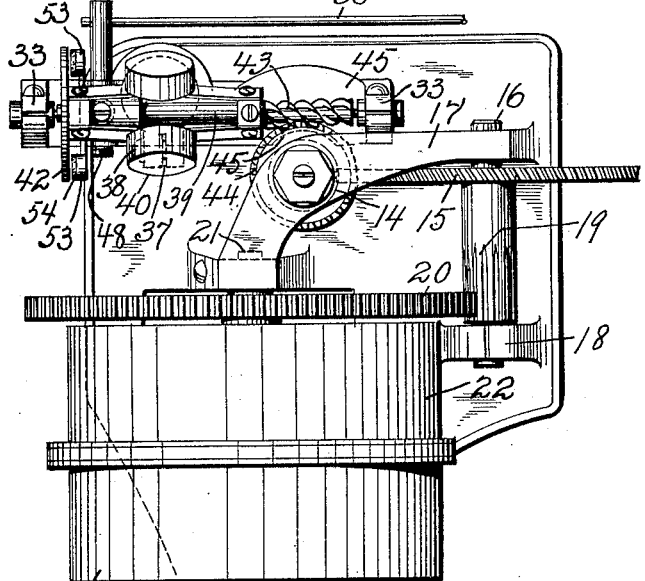
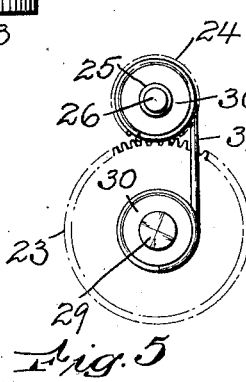
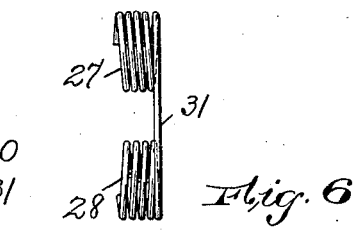
INVENTORS.
Thomas E. White
and George McIntosh,
BY
Wm. H. Campfield
ATTORNEY

UNITED STATES PATENT OFFICE.

THOMAS E. WHITE AND GEORGE McINTOSH, OF NEWARK, NEW JERSEY.

PHONOGRAPH-MOTOR.

1,349,401.  Specification of Letters Patent. Patented Aug. 10, 1920.

Application filed March 25, 1919. Serial No. 284,923.

*To all whom it may concern:*

Be it known that we, THOMAS E. WHITE and GEORGE McINTOSH, citizens of the United States, and residents of Newark, county of Essex, and State of New Jersey, have invented certain new and useful Improvements in Phonograph - Motors, of which the following is a specification.

This invention relates to an improved motor for phonographs and like instruments, and is designed to provide a motor that embraces improvements to insure smooth operation and ease of assembly.

The invention comprises a motor which is capable of easy and quick adjustment, especially in the adjustment of the mechanism that operates the governor of the motor, and an improved mounting to support the governor.

A still further improvement is a braking device for the motor, which device is economically manufactured, easily installed and positive in its operation.

The invention is illustrated in the accompanying drawing, in which Figure 1 is a side view of our improved motor, and Fig. 2 is a bottom view of the same. Fig. 3 is a section taken on line 3—3 in Fig. 1. Fig. 4 is a perspective view of a clip used as part of the brake of the governor. Fig. 5 is a view showing the ends of the spring shaft and the winding shaft with our improved retaining device, and Fig. 6 is a view of the retaining device alone.

The motor can be arranged as desired, but it is preferably secured on the under side of the top 10 of a phonograph casing and is usually held from operation by a brake, which is not shown, the operation of this brake being well known to the average person and particularly those skilled in the art, being applied to a rotating record table or support, which is rotated by a spindle 11 which projects up through the top of the phonograph case.

The spindle is an extension of the shaft 12 which is mounted in the frame of the motor, the frame consisting of a top plate 13 and suitable projecting parts which form bearings for the revolving parts of the motor. The shaft 12 is driven preferably by reason of the gear 14 being in mesh with the gear 15, the gear 15 being mounted on a shaft 16, one end of which is supported by the bearing frame 17, and the other by a suitable bearing 18. This same shaft has a pinion 19 thereon, which is in mesh with the main gear 20 mounted on the shaft 21 and driven from a spring motor 22. This motor is of any usual or accepted type and rotates the gear 20 in one direction, being wound ready for operation usually by manual means, such winding being usually done by a geared mechanism so as to make it easier to wind the spring.

In the type of motor illustrated, this winding is accomplished by having the gear 23 in mesh with a pinion 24, the pinion 24 being mounted on a winding shaft 25, the end 26 of which is usually arranged to receive the end of the crank which projects out through the side of the machine and by means of which the motor is wound. The gears 23 and 24, being directly in mesh, rotate in opposite directions, and to prevent their reverse rotation, and acting as a noiseless means for such prevention of reversal, we provide a pair of coils 27 and 28, these coils being turned in a direction in opposition to the winding direction of the elements on which they are placed, so that when the coil 27 is placed on the shaft 25, and when the coil 28 is placed on the shaft 29, they are subjected to a frictional engagement when the winding takes place in opposition to the direction of locking, so that the coils are slightly enlarged and permit easy rotation of these elements.

We prefer to place these coils on drums 30 which, if desired, can be slightly grooved to assist in keeping the coils seated. The coils are usually made from the same piece of wire, which wire connects them, forming a straight connecting strand 31, so that when the winding is stopped and reverse rotation is to be prevented, the frictional contact of the coils and the drums 30 wraps or draws the coils tightly around the drums and holds them and their shafts against reverse rotation, the coils themselves being held in place by reason of the strand 31 having enough tensile strength and being without appreciable elasticity, so that the locking is quick and noiseless and does not have any of the disadvantages of a pawl and ratchet device for this purpose.

To control the speed of the device governors are employed, and it is usual to place these governors with the ends of the governor shafts in fixed bearings that are slightly eccentric so that an adjustment can be made, but these usually are placed so that they are somewhat inaccessible when the motor is in place and the adjustment is difficult on account of the necessity of holding the spindle in its adjusted position while a set-screw is fastened into place.

Our improved device overcomes this and is also provided with a means of economical structure for limiting the speed of the regulator so that the speed of the record can be easily controlled. The regulator is mounted on a bracket 32 which has bearing posts 33 at the ends, and intermediate of its ends is provided with a stud 34. The stud fits into a socket 35 formed into the post 36, the post 36 being split, as at 37, the split portion being adapted to be drawn together, by the screw 38, so that the stud 34 can be locked in any position, and when the screw 38 is loosened, the stud can be turned slightly so as to permit the bracket 32 to swing.

Suspended between the posts 33 is a governor shaft 39, the governor being of the usual type with centrifugal weights 40 held by springs 41, and as the speed of the motor increases, the centrifugal force causes these weights to move farther from the shaft and draw the sliding member or disk 42 along the governor shaft against a braking device, which will be described hereinafter.

The governor shaft is rotated by reason of the worm 43 being in mesh with the worm gear 44 on the shaft 12, and to provide for an easy and quick adjustment of the worm with the worm gear, the bracket can be swung by means of the stud 34 fitting in the socket 35 as hereinbefore described.

It will thus be seen that the adjustment to provide for a noiseless and easy operation of the regulator can be quickly provided.

The bracket 32 is provided with a bridge portion 45 to encompass the edge of the gear 14. The bracket is provided with two ears 46 and 47, one of which is screw-threaded on the inside to receive the screw-threaded end 48 of the stem 49, so that when the stem is screwed approximately in place it can be rocked to the slight extent to which it is necessary to rock it, and it is locked against withdrawal without the use of any other element.

A screw 50 is secured in the stem, the inner end of the screw being usually reduced, as at 51, thus forming a shoulder to limit the insertion of the screw 50, the screw thus supporting, between its head and the stem 49, the ears 52 of a substantially U-shaped clip 53, the U-shaped form permitting this clip to extend on either side of the regulator shaft 39, the ends of the clip 53 being provided with suitable braking surfaces 54, these braking surfaces being made of suitable material, such as small disks of leather, and, being held at a predetermined point, limit the sliding of the disk 42 and thus limit the speed of the regulator or governor and consequently limit the speed of the motor, which, in turn, controls the speed at which the record is played.

The clip 53 swings freely on the screw 50 and its two ends are thus in a sense balanced and bear equally on the face of the disk 42.

To provide for the positioning of the braking device, the same is pressed in one direction by a suitable regulating device, such as a screw 55, although any other suitable means can be employed, which bears on a lever 56 to force it in one direction against the influence of a spring 57, which spring acts to pull it in the other direction when the regulating screw 55 is retreated.

It will be seen that this regulator for the governor and the governor itself can be quickly assembled, is easily operated, is substantially noiseless in its operation and is a decided improvement in devices of this kind as previously made.

We claim:

1. A phonograph motor comprising a driving mechanism, a governor with an element thereon in mesh with an element of the driving mechanism, a bracket in which the governor and its element are mounted, a bearing on which the bracket swings so as to regulate the meshing of the elements, and means for locking the bracket in the bearing.

2. A phonograph motor comprising a driving mechanism, a governor, a bracket in which the governor is supported, a worm on the governor, a worm gear in the driving mechanism, a raised socket, a stud on the bracket and fitting in the socket so that the bearing can be swung to adjust the worm relative to the gear, and means for fastening the stud against swinging.

3. A phonograph motor comprising a driving mechanism, a governor, a bracket in which the governor is supported, a worm on the governor, a worm gear in the driving mechanism, a raised socket, a stud on the bracket and fitting in the socket so that the bearing can be swung to adjust the worm relative to the gear, means for fastening the stud against swinging, ears on the bracket, a disk on the governor, a stem in the ears, one of said ears and the stem being threaded, and a friction device mounted on the stem and adapted to be engaged by the disk.

4. A phonograph motor comprising a driving mechanism, a governor, a bracket in which the governor is supported, a worm on the governor, a worm gear in the driving mechanism, a raised socket, a stud on the bracket and fitting in the socket so that the bearing can be swung to adjust the worm relative to the gear, means for fastening the stud against swinging, ears on the bracket, a disk on the governor, a stem in the ears, one of said ears and the stem being threaded, a U-shaped clip with projecting perforated ears, a screw passing through the ears and radially secured in the stem, and means for turning the stem.

5. In a phonograph motor, a governor including a disk, ears, a stem fitting in the ears, one of the ears and the stem being in screw-threaded engagement, a U-shaped clip with projecting ears, a screw passing through the ears of the clip and radially into the stem, a braking surface on the clip to engage the face of the disk, and means for turning the stem, whereby the clip is actuated.

6. In a phonograph motor, a governor including a disk, ears, a stem fitting in the ears, one of the ears and the stem being in screw-threaded engagement, a U-shaped clip, means for securing the clip to the stem so that it can rock in a plane approximately radial to the stem, and means for turning the stem.

In testimony that we claim the foregoing, we have hereto set our hands, this 22nd day of March, 1919.

THOMAS E. WHITE.
GEORGE McINTOSH.